(12) United States Patent
Gerstman

(10) Patent No.: US 7,224,410 B1
(45) Date of Patent: May 29, 2007

(54) REMOTE CONTROL DEVICE FOR A TELEVISION RECEIVER WITH USER PROGRAMMABLE MEANS

(76) Inventor: George H. Gerstman, Seyfarth Shaw LLP, 131 So. Dearborn St., Suite 2400, Chicago, IL (US) 60603

( * ) Notice: Subject to any disclaimer, the term of this patent is extended or adjusted under 35 U.S.C. 154(b) by 0 days.

(21) Appl. No.: 11/551,026

(22) Filed: Oct. 19, 2006

(51) Int. Cl.
*H04N 5/44* (2006.01)

(52) U.S. Cl. .................... 348/734; 348/706

(58) Field of Classification Search ............. 348/734, 348/706, 569; 725/38, 39; 341/176; 340/825.69, 340/825.72, 825.75, 825.76; 710/14, 15, 710/63; 398/111, 112
See application file for complete search history.

(56) References Cited

U.S. PATENT DOCUMENTS

| | | | |
|---|---|---|---|
| 3,943,491 A * | 3/1976 | Castleberry et al. ... | 340/825.75 |
| 4,114,099 A * | 9/1978 | Hollander .................. | 348/734 |
| 5,537,106 A | 7/1996 | Mitsuhashi | |
| 6,587,067 B2 | 7/2003 | Darbee et al. | |
| 6,916,098 B2 * | 7/2005 | Salvatori et al. ............ | 353/122 |
| 7,046,185 B2 * | 5/2006 | Griesau et al. ............. | 341/176 |
| 7,109,908 B2 | 9/2006 | Griesau et al. | |
| 2004/0025179 A1 * | 2/2004 | Russ et al. .................... | 725/46 |
| 2004/0090556 A1 * | 5/2004 | Kamieniecki et al. ...... | 348/558 |
| 2004/0123327 A1 * | 6/2004 | Fai Ma et al. ............. | 725/100 |
| 2004/0174288 A1 * | 9/2004 | Park .......................... | 341/176 |
| 2005/0120383 A1 * | 6/2005 | Ozaki et al. ................ | 725/131 |
| 2006/0020356 A1 * | 1/2006 | Kano .......................... | 700/94 |
| 2006/0259784 A1 * | 11/2006 | Niwamoto et al. ......... | 713/193 |

OTHER PUBLICATIONS

DIRECTV HD Receiver User Guide (2004) (101 pgs.).

* cited by examiner

*Primary Examiner*—Victor R. Kostak
(74) *Attorney, Agent, or Firm*—George H. Gerstman; Seyfarth Shaw LLP

(57) ABSTRACT

A remote control device for a television receiver having a user-controlled restore function. The remote control device has a user-programmable switch for enabling the user to store user-selected data in a memory, including TV input data and channel data. The restore switch is provided for enabling a microprocessor to transmit digital data to an infrared or RF transmitter, corresponding to the user-selected data. Actuation of the restore switch will restore the television receiver to a state of operation responsive to the user-selected stored data based on the user's settings of the user-programmable switch.

14 Claims, 2 Drawing Sheets

REMOTE CONTROL DEVICE FOR A TELEVISION RECEIVER WITH USER PROGRAMMABLE MEANS

FIELD OF THE INVENTION

The present invention concerns a novel hand-held remote control device for a television receiver. As used in the specification and claims herein, the term "television receiver" comprises a display that is capable of displaying television programs and includes, for example, a television monitor with or without an integrated tuner.

BACKGROUND OF THE INVENTION

Modern television receivers are replete with inputs for displaying the output of various electronic equipment. For example, in modern high definition television receivers, there may be a 75 ohm RF input, one or more S-video inputs, two or more composite video inputs, two or more component video inputs, two or more HDMI or DVI inputs, and numerous audio inputs. The remote control device for the television receiver ordinarily has push buttons to enable remote actuation of the respective inputs on the receiver. The remote control device may also be "universal" in that it also operates to control the electronic and sound components (equipment) that are connected to the respective inputs. As a result of the large number of inputs that are controlled by the remote control and also the different electronic components (equipment) that are controlled by the remote control device, a person who is not a technophile may become confused when using the remote control device and may find it difficult to return to the particular mode and input desired.

For example, the user may ordinarily desire to watch a program transmitted on a desired channel via a satellite receiver or cable receiver connected to one of the HDMI inputs of the high definition television receiver. However, that user, or someone else, may have watched a DVD on a DVD player that is connected to one of the component inputs to the television receiver. The user who is not a technophile may find himself or herself unable to return to the desired satellite or cable channel on the HDMI input after the DVD has been viewed due to the complexities of the remote control device which is involved with a large number of inputs and several modes.

As used herein, the term "user" refers to a consumer who has access to the television receiver after it has been shipped by the manufacturer.

In addition to not having a full understanding of the operation of the remote control device, the user may not be aware of the particular designations of all of the inputs to know which input is supporting, for example, the satellite or cable receiver connected to one of the HDMI inputs. For example, the inputs may be labeled video 1, video 2, video 3, component 1, component 2, component 3, HDMI 1, and HDMI 2. Even if the user understands the operation of the remote control device, he or she may not know which of the named inputs which are displayed on the television display, is the one to which the satellite or cable receiver is connected.

It is, therefore, an object of the invention to provide a remote control device for a television receiver which enables the user to rapidly and easily find a desired mode and/or input for displaying the output of a selected electronic component.

SUMMARY OF THE INVENTION

I have discovered a system in which the user can preset desired information so that the user can rapidly and easily use the remote control device to provide the desired results. In accordance with the illustrative embodiment of the invention, a remote control device is provided for a television receiver. The remote control device comprises a transmitter, a controller with memory, a keyboard for providing input signals to the controller, and a power source for the controller.

The keyboard has a mode selector and a power switch for activating and deactivating equipment based on the position of the mode selector. The keyboard also has a TV input selector for selecting the input to the television receiver that is activated for display of the output of the equipment connected to the selected input. The keyboard also has a channel selector for selecting a desired channel.

The keyboard has a user-programmable switch for enabling the user to store user-selected data, in the memory. The user-programmable switch could be designated as a "set home" switch or the like. A restore switch, which could be designated a "home" switch or the like, is provided for enabling the controller to transmit the data corresponding to the user-selected data, to the transmitter. In this manner, actuation of the restore switch will restore the television receiver to a state of operation responsive to the user-selected stored data based on the user's setting of the user-programmable switch.

In the illustrative embodiment of the invention, the mode selector enables selection of a satellite or cable receiver, a television tuner and an audiovisual device. The TV input selector enables selection of a component video input, a composite video input, and an HDMI input.

In the illustrative embodiment, the controller includes a microprocessor and is operable to provide digital signals to the transmitter. The transmitter comprises either an RF transmitter or an infrared transmitter. The RF transmitter sends out binary coded radio frequency signals. The infrared transmitter sends out binary codes in a form of pulses of light.

A more detailed explanation of the invention is provided in the following description and claims, and is illustrated in the accompanying drawings.

DETAILED DESCRIPTION OF THE ILLUSTRATIVE EMBODIMENT

Figure 1:
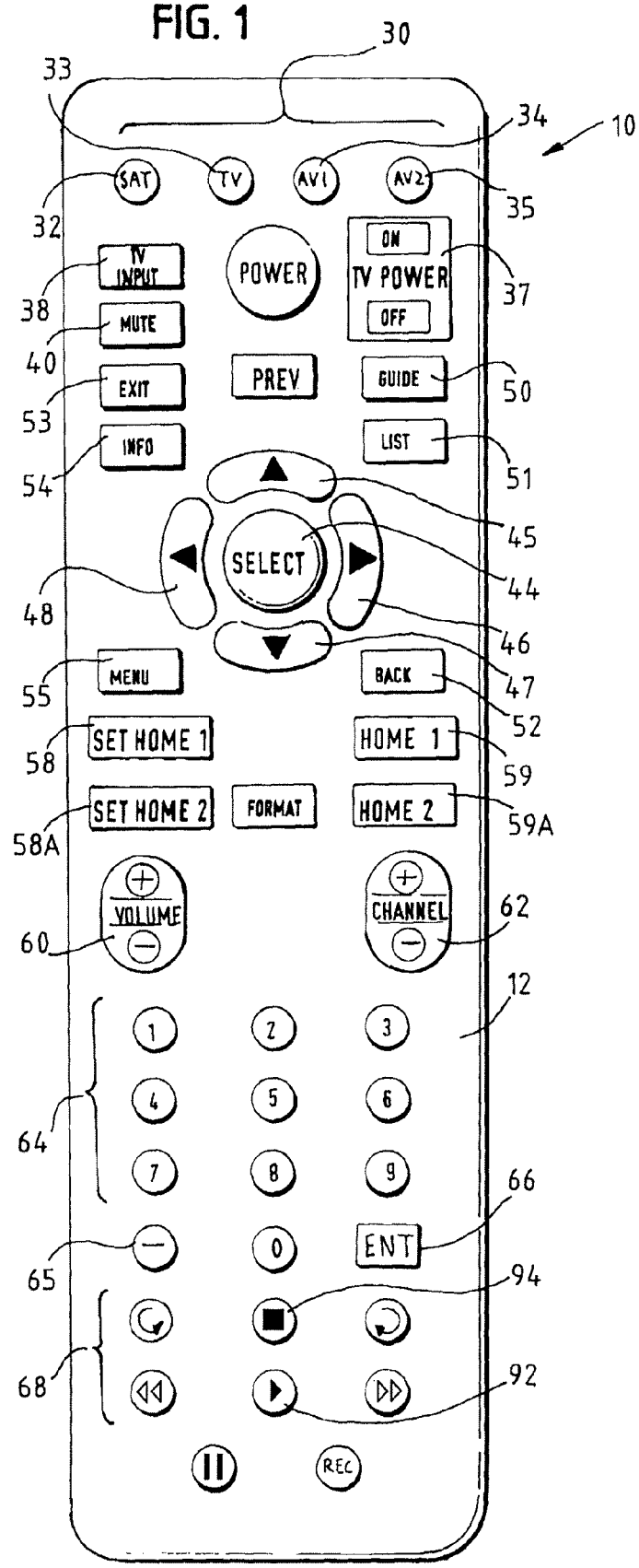
FIG. 1 is a front view of a remote control device in accordance with the principles of the present invention.
Figure 2:
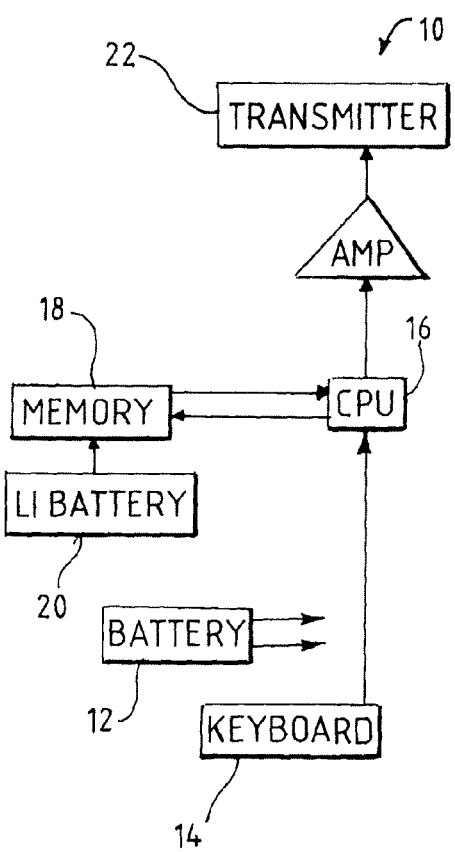
FIG. 2 is a block diagram of the components of the remote control device of FIG. 1.

Referring to FIG. 1, a remote control device 10 comprising a housing 12 and keyboard 14 illustrated. As illustrated in the block diagram of FIG. 2, remote control unit 10 includes, as is well known in the art, a battery 12 for powering the components of the remote control unit. Keyboard 14 contains numerous push-button switches as illustrated in FIG. 1, a controller in the form of a central processing unit 16 with memory 18, a lithium-ion battery 20 for maintaining memory 18, and a transmitter 22 for transmitting digital code signals to a television receiver and to other equipment connected to the inputs of the television receiver.

Transmitter 22 could be an infrared transmitter which transmits infrared signals or may be an RF transmitter which transmits radio frequency signals to the television receiver and to other equipment connected to the television receiver. Keyboard 14 could comprise push button type switches which extend outwardly from the housing or could be a touch screen type keyboard.

In operation, a signal from the particular button on the keyboard 14 that is pressed is sensed by the processor 16. Data which may be in the form of seven-bit binary commands, corresponding to that button function, is sent from the controller, is amplified and presented to the transmitter 22. The transmitter 22, if an infrared transmitter, translates the data (digital code signal) into infrared light. If the transmitter is a RF transmitter, the digital code signal is translated into RF waves. The output of the transmitter is sensed by the infrared or RF receiver on the television receiver and other electronic equipment being controlled.

The remote control device illustrated in FIG. 1 is an illustrative example of a device constructed in accordance with the principles of the present invention. Although it is illustrated for use with a satellite receiver for receiving satellite signals, it could be used for controlling a cable receiver and/or various other electronic equipment.

Remote control device 10 includes mode selector 30 which in the illustrative embodiment, comprises four buttons 32, 33, 34, and 35. Instead of four separate buttons, a slider switch or other means for selecting between a plurality of electrical components could be utilized.

In the illustrative embodiment, button 32 controls the satellite receiver; button 33 controls the television; button 34 controls an audiovisual device such as a VCR; and button 35 controls another audiovisual device such as a DVD player.

A power button 36 is provided to control the power with respect to the electrical component that has been selected by the switches 32, 33, 34, or 35. For example, if button 32 is actuated, the satellite receiver will be controlled by power button 36.

A TV/power button 37 is provided to control the combination of the television and the satellite receiver. Thus when the "on" switch of button 37 is actuated, both the television receiver and the satellite receiver will be on. Likewise, when the "off" switch of TV/power button 37 is actuated, both the satellite receiver and the television receiver will be off.

A TV input button 38 is provided to control which input of the TV is operated. TV input button can scroll through the various inputs such as the RF input, the S video input, the composite video inputs, the component video inputs and the HDMI inputs. If desired, separate buttons could be used for each separate input.

A "mute" button 40 is provided to mute the audio. A "previous" button 42 is provided to tune the television to the last channel viewed. A "select" button 44 with directional arrows 45, 46, 47, and 48 is provided to select items that are highlighted on the display, with the arrows being operated to move the highlighting of the item in a direction of the particular arrows.

A "guide" button 50 is provided for displaying a programming guide on the television display. "List" button 51 is provided for displaying a "to do list" on the television display. "Back" button 52 is provided for presenting a screen that the user has viewed previously. "Exit" button 53 is provided to exit from the guide that is being displayed. "Info" button 54 is provided to display information concerning a program that is being viewed. "Menu" button 55 is provided to display a menu of settings. "Format" button 56 is provided for cycling through the various display formats.

"Set home" button 58 is provided to enable the user to set a selected display which can be accessed at any time by actuating "home" button 59. Button 58 enables a user to present a particular setting or settings so that at a subsequent time, when the "home" button 59 is actuated, the display will be restored to the result of these desired settings. For example, assume that the user wants the system to always be restored to satellite channel 79 being displayed, but also be available to change the satellite channel after satellite channel 79 is displayed. This would normally require the TV input button 38 to be pressed until it cycles to the HDMI input for the satellite receiver. It would also require that button 32 be pressed to control the satellite receiver and that channel 79 be selected on the satellite receiver. If a certain display format was desired, it would also require that "format" button 56 be pressed to cycle to the desired format.

All of the aforementioned steps to restore the settings to channel 79 of the satellite receiver being displayed are unnecessary using the present invention, in which these settings are set in advance by the user using "set home" button 58. And, at a subsequent time, when these settings are desired, the "home" button 59 is pressed and regardless of what is being shown and/or played on the television receiver, it will automatically be restored to the user-selected state of operation. This is particularly useful, for example, if the user has watched a DVD on a DVD player that is connected, for example, to one of the component video inputs but the user now wants to watch television transmitted via the satellite receiver. The user merely has to press the "home" button 59 and the remote control device will provide signals to the television receiver and the satellite receiver to automatically change the settings so that channel 79 will be displayed on the television receiver.

It is to be understood that the "home" button can be actuated to restore the system to any settings that have been set by a user, using the "set home" button 58. For example, the user might set the "set home" button so that the television receiver is ready for displaying a DVD from a DVD player. There could be two or more "set home" buttons 58 and 58a (for example set home 1, set home 2, etc.) and there also could be two or more "home" buttons 59 and 59a, corresponding to the set home buttons 58 and 58a (for example, home 1, home 2, etc.). "Set home 1" button 58 could be programmed to restore to a particular channel from the satellite receiver; "set home 2" button 58a could be programmed to restore to the settings for playing a DVD; and a "set home 3" button (not shown) could be programmed for restoring to the RF input for showing a television program directly from an outside antenna connected to the RF input.

Of course, the buttons may be labeled other than "set home" and "home" as desired. For example, buttons 58 and 59 may be labeled "set restore" and "restore", respectively, or any other label which the manufacturer deems desirable.

It is preferred that for the user to actuate the programming function using the "set home" button, the "set home" button must be pressed a predetermined number of times (e.g. three times) within a predetermined time interval (e.g. two seconds), or that it must be pressed for at least a predetermined period of time (e.g. one second). This will prevent inadvertent programming by a user. This operation of the "set home" button 58 will delete any previously-stored data.

An audible sound from a speaker (not shown) within the remote control device housing is used to indicate that the storage of data in memory 18 was successful.

Remote control unit 10 also includes an up-down volume switch 60 and an up-down channel switch 62. There are also number keys 64, a dash key 65 for entering a digital satellite channel such as 5-1, and an "enter" button 66. VCR and DVD control buttons 68 are also provided.

Figure 3:
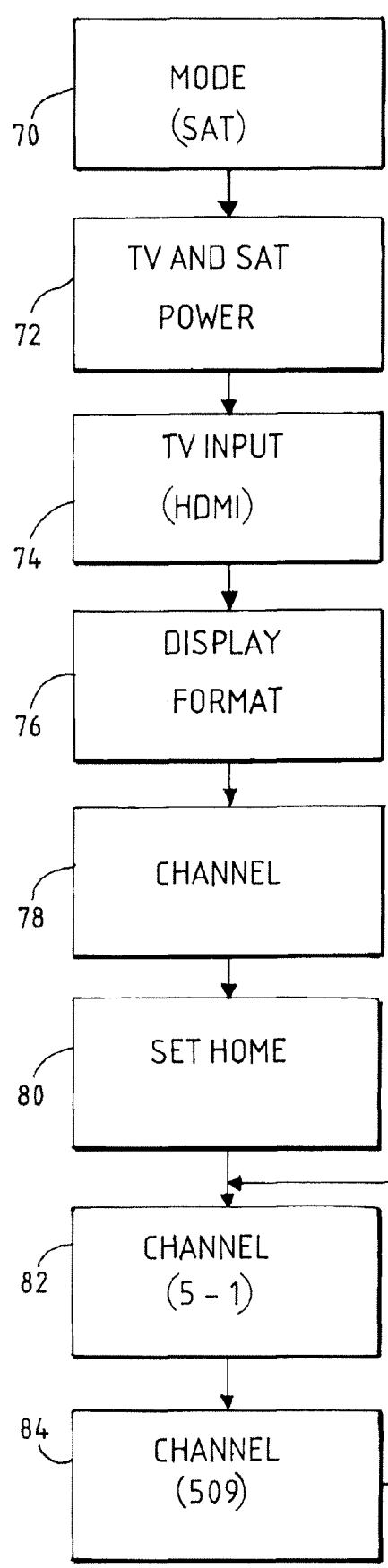
FIG. 3 is a flow chart showing an illustrative operation of the remote control device of FIG. 1, in accordance with the principles of the present invention.
Figure 3:
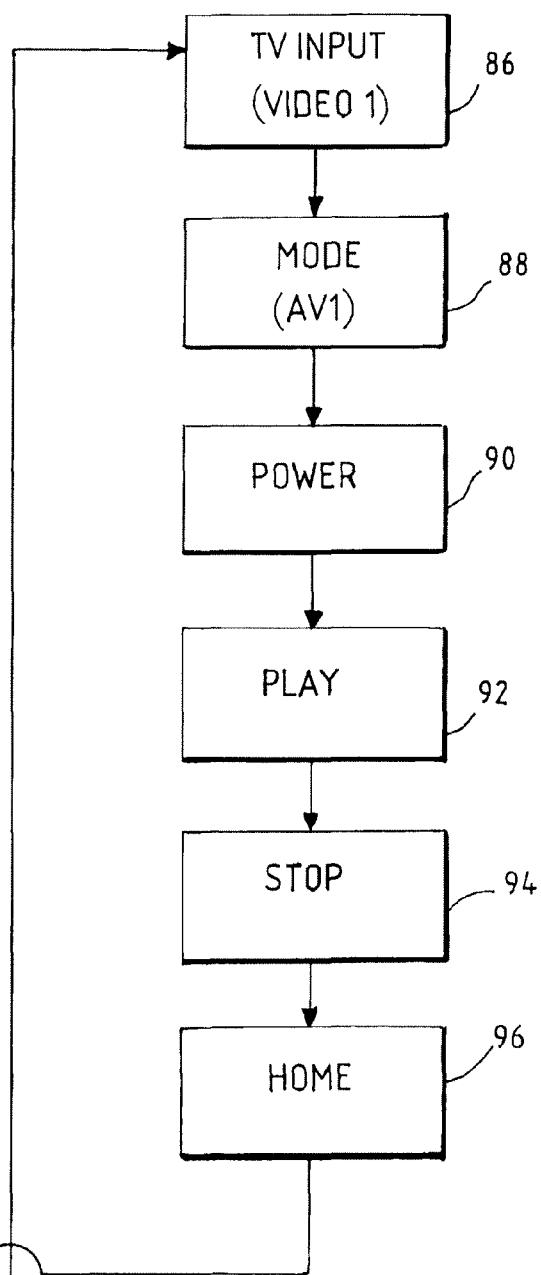

FIG. 3 is a flow chart showing a typical operation of the present invention. Referring to FIG. 3, mode selector 30 is actuated to select the satellite receiver (70). TV power button 37 is set to "on" to actuate the television receiver and the satellite receiver (72). The TV input button 38 is pressed to cycle to an appropriate HDMI input (74). Display format button 56 is pressed to select the desired display format (76). The appropriate buttons from number buttons 64 are pressed to select the desired channel (78).

If the user now has a desired setting to which he or she wants the system to be automatically restored, the "set home" button 58 is pressed (80). This can be accomplished initially when the television receiver is purchased and first set up or it can be done much more often. In any event, by using the "set home" button 58, the settings information is stored in memory 18 for subsequent access. For example, data concerning the selected mode, TV input, display format, and channel is stored for subsequent retrieval when the "home" button 59 is pressed.

After the "set home" button 58 is pressed to program the restore selections, the remote control device can be operated to do whatever is desired. For example, the user may now wish to view channel 5-1 (82), then to view channel 509 (84), and then to play a DVD. To play the DVD, the user presses the TV input button 38 to cycle to video 1 (86) and presses AV 1 button 34 so that the DVD player can be controlled (88). Power button 36 is then actuated to turn on the DVD player (90). Play button 92 (FIG. 1) is pressed to start the DVD player in its play mode and the other buttons in set 68 are used to control the playing of the DVD. At the appropriate time stop button 94 is pressed to stop the playing of the DVD.

Occasionally persons who are not technophiles have difficulty returning from the playing of a DVD to the normal viewing of a broadcast channel on the television receiver. By using the present invention, the user can now simply press the "home" button 59 and the programming of the setting that has previously been stored by the user (by using "set home" button 58) will then restore the television receiver to the desired status.

It can be seen that in accordance with the present invention the user is able to program the remote control device so that upon actuation of a button designated "home" or the like, a desired status will be obtained. In this manner, the user has control with respect the programming of the restore signals that are stored in memory. It is to be understood that the user who presses the set home button 58 may be a different consumer from the person who presses the home button 59 subsequently.

The restore signals that can be stored by the user may include TV input data and channel data. In addition, they may also include mode selection data and format data. For example, in the FIG. 3 flow diagram, there is shown the storage of mode selection data, TV input data, display format data, and channel selection data, in memory 18. This occurs because the actuation of the "set home" button, in the illustrative embodiment, stores all data that is currently input by the various selected buttons, in memory 18.

Although an illustrative embodiment of the invention has been shown and described, it is understood that various modifications and substitutions may be made by those skilled in the art without departing from the novel spirit and scope of the present invention.

The invention claimed is:

1. A remote control device for a television receiver having a plurality of equipment inputs to which various equipment may be connected, which comprises:
   a transmitter;
   a controller with memory;
   a keyboard for providing input signals to the controller;
   a power source for the controller and the transmitter;
   the keyboard having:
   (a) a mode selector,
   (b) a power switch for activating and deactivating equipment based on the position of the mode selector,
   (c) a TV equipment input selector for selecting the equipment input to the television receiver that is activated for display of the output of the equipment connected to the selected equipment input,
   (d) a channel selector,
   (e) a user programmable switch for enabling the user to store user-selected data in a memory;
   (f) said user selected data including TV equipment input selector data for selecting the desired equipment input of the plurality of equipment inputs; and
   (g) a restore switch for enabling the controller to transmit data, corresponding to the user-selected data, to the transmitter;
   whereby actuation of the restore switch restores the television receiver to a state of operation responsive to the user-selected stored data based on the user setting of the user programmable switch, enabling the user to return automatically to a previously selected equipment input.

2. A remote control device for a television receiver as defined in claim 1, in which the mode selector enables selection of a satellite or cable receiver, a television tuner and an audiovisual device, and in which the TV equipment input selector enables selection of a component video input, a composite video input, and a HDMI input.

3. A remote control device for a television receiver as defined in claim 1, in which the channel selector comprises a plurality of separate switches.

4. A remote control device for a television receiver as defined in claim 1, in which the channel selector comprises a rocker switch for up/down channel selection.

5. A remote control device for a television receiver as defined in claim 1, in which the controller comprises a microprocessor and is operable to provide digital code signals to the transmitter.

6. A remote control device for a television receiver as defined in claim 1, in which the transmitter comprises one of an RF transmitter and an infrared transmitter.

7. A remote control device for a television receiver as defined in claim 1, in which a keyboard comprises a touch screen keyboard.

8. A remote control device for a television receiver as defined in claim 1, in which the switches comprise raised buttons.

9. A remote control device for a television receiver as defined in claim 1, in which the data corresponding to the user-selected data comprises amplified seven-bit binary commands.

10. A remote control device for television receiver having a plurality of equipment inputs to which various equipment may be connected, which comprises:
  a transmitter;
  a controller with memory, said controller including a microprocessor;
  a keyboard for providing input signals to the controller;
  a battery power source for the controller and the transmitter;
  the keyboard having:
    (a) a mode selector enabling selection of a satellite or cable receiver, a television tuner and an audiovisual device,
    (b) a power switch for activating and deactivating equipment based on the position of the mode selector,
    (c) a tv equipment input selector for selecting the input to the television receiver that is activated for display of the output of the equipment connected to the selected equipment input, said tv equipment input selector enabling selection of a component video input, a composite video input, and a HDMI input,
    (d) a channel selector, including switches for selecting a desired channel,
    (e) a user-programmable switch for enabling the user to store user-selected data in a memory;
    (f) said user selected data including TV equipment input selector data for selecting the desired equipment input of the plurality of equipment inputs; and
    (g) a restore switch for enabling the controller to transmit digital data, corresponding to the user-selected data, to the transmitter;
  whereby actuation of the restore switch restores the television receiver to a state of operation responsive to the user-selected stored data based on the user setting of the user programmable switch, enabling the user to return automatically to a previously selected equipment input.

11. A remote control device for television receiver as defined by claim 10, including a second user-programmable switch for enabling the user to store other user-selected data in a memory, and a second restore switch for enabling the controller to transmit digital data, corresponding to the other user-selected data, to the transmitter.

12. A remote control device for television receiver as defined by claim 10, in which the user-programmable switch must be engaged continuously for at least a predetermined period of time in order for user-selected data to be stored in the memory.

13. A remote control device for television receiver as defined by claim 10, in which the user-programmable switch is a button that must be pressed a predetermined number of times within a predetermined period of time in order for user-selected data to be stored in the memory.

14. A method for operating a remote control device for a television receiver having a plurality of equipment inputs to which various equipment may be connected, comprising the steps of:
  providing a transmitter, a controller with memory, a keyboard for providing input signals to the controller, and a power source for the controller and the transmitter,
  the keyboard having a mode selector, a power switch, a TV equipment input selector, a channel selector, a user programmable switch, and a restore switch;
  setting the mode selector;
  actuating the power switch for activating and deactivating equipment based on the position of the mode selector;
  actuating the TV equipment input selector to select the equipment input to the television receiver that is activated for display of the output of the equipment connected to the selected equipment input;
  actuating the channel selector to select a desired channel;
  actuating the user programmable switch to store user-selected data in a memory;
  said user selected data including TV equipment input selector data for selecting the desired equipment input of the plurality of equipment inputs; and
  actuating the restore switch for enabling the controller to transmit data to the transmitter, corresponding to the user-selected data;
  whereby actuation of the restore switch will restore the television to a state of operation responsive to the user-selected stored data based on the user's setting of the user programmable switch, enabling the user to return automatically to a previously selected equipment input.

* * * * *